US012098749B1

(12) United States Patent
Lu et al.

(10) Patent No.: US 12,098,749 B1
(45) Date of Patent: Sep. 24, 2024

(54) LARGE-STROKE AIR FLOTATION TYPE NANO-POSITIONING PLATFORM

(71) Applicant: WUXI XIVI SCIENCE AND TECHNOLOGY CO., LTD., Wuxi (CN)

(72) Inventors: Minjie Lu, Wuxi (CN); Xiaoli Han, Wuxi (CN)

(73) Assignee: WUXI XIVI SCIENCE AND TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 18/655,350

(22) Filed: May 6, 2024

Related U.S. Application Data

(63) Continuation of application No. PCT/CN2024/079804, filed on Mar. 4, 2024.

(30) Foreign Application Priority Data

Oct. 13, 2023 (CN) .......................... 202311322270.X

(51) Int. Cl.
*F16C 32/06* (2006.01)
*F16C 29/00* (2006.01)
*F16C 29/02* (2006.01)

(52) U.S. Cl.
CPC ........ *F16C 32/0618* (2013.01); *F16C 29/002* (2013.01); *F16C 29/025* (2013.01); *F16C 32/0677* (2013.01); *Y10T 74/20354* (2015.01)

(58) Field of Classification Search
CPC .. F16C 29/002; F16C 29/025; F16C 32/0603; F16C 32/0618; F16C 32/0677; Y10T 74/20354
See application file for complete search history.

(56) References Cited

U.S. PATENT DOCUMENTS

| | | | | |
|---|---|---|---|---|
| 5,799,543 | A | * 9/1998 | Nagai | ................. B25J 19/0029 74/490.09 |
| 6,226,075 | B1 | * 5/2001 | Loopstra | ............. F16F 15/0232 355/76 |
| 2004/0046294 | A1 | 3/2004 | Kubo et al. | |
| 2013/0016927 | A1 | * 1/2013 | Sung | ..................... F16C 29/025 384/8 |

(Continued)

FOREIGN PATENT DOCUMENTS

| CN | 110319146 A | 10/2019 |
|---|---|---|
| CN | 116447228 A | 7/2023 |

*Primary Examiner* — Phillip A Johnson
(74) *Attorney, Agent, or Firm* — True Shepherd LLC; Andrew C. Cheng

(57) ABSTRACT

A platform comprises a base platform, a linear motor is provided on the base platform and connected with an air flotation platform, a bearing platform is provided below the air flotation platform, a plurality of shock absorption assemblies are embedded in the base platform and arranged at intervals below the bearing platform, the shock absorption assembly comprises a bottom plate, shock absorption columns are symmetrically provided on an upper end of the bottom plate, a piston is cooperatively arranged in the shock absorption column, a cavity is formed between a bottom end of the piston and an inner wall of the shock absorption column, a sliding rod is fixed on an upper end of the piston, and an assembly joint is connected to a top end of the sliding rod and to a bottom end of the bearing platform.

3 Claims, 8 Drawing Sheets

(56) References Cited

U.S. PATENT DOCUMENTS

| | | | |
|---|---|---|---|
| 2015/0063730 A1* | 3/2015 | Sakai | G01B 3/20 |
| | | | 384/26 |
| 2015/0104124 A1 | 4/2015 | Delgado Marquez et al. | |
| 2016/0186802 A1* | 6/2016 | Hashimoto | F16C 32/0648 |
| | | | 384/12 |
| 2023/0349421 A1 | 11/2023 | Jeung et al. | |

* cited by examiner

LARGE-STROKE AIR FLOTATION TYPE NANO-POSITIONING PLATFORM

CROSS-REFERENCE TO RELATED APPLICATIONS

This application is a continuation of International Patent Application No. PCT/CN2024/079804 with a filing date of Mar. 4, 2024, designating the United States, now pending, and further claims priority to Chinese Patent Application No. 202311322270.X with a filing date of Oct. 13, 2023. The content of the aforementioned applications, including any intervening amendments thereto, are incorporated herein by reference.

TECHNICAL FIELD

The present disclosure belongs to the technical field of precision servo drive, particularly relating to a large-stroke air flotation type nano-positioning platform.

BACKGROUND ART

In recent years, microelectronic device and integrated chip processing technology, scanning microscopy imaging technology, quantum material preparation technology, biomedical engineering technology and other high-grade, high-precision, advanced technologies have flourished, the accuracy and performances that systems thereof can achieve depend on the accuracy and performances of nano-shifting and positioning subsystems thereof to a great extent, and with the development of nano-lithography, scanning tunneling microscopy, atomic force microscopy, micro-electromechanical systems and other technologies, a great development has also been made on nano-shifting and positioning platforms.

In the prior art, most shifting and positioning platforms are driven by piezoelectric ceramic actuators, having a series-parallel structure with an amplification mechanism and a decoupling structure. Compared with the series structure, the parallel structure has significant advantages such as high stiffness, high load bearing capacity, high speed and high positioning accuracy, but it is difficult to decouple at the same time. Compared with traditional driving methods, the driving method of the piezoelectric ceramic actuator has advantages such as high control accuracy, rapid response, large driving force, low driving power and wide operation frequency, but it is difficult to achieve a large stroke. Amplification mechanisms used in nano-positioning platforms usually comprise traditional lever amplification and bridge type amplification mechanisms, the lever amplification has high stiffness, but in order to achieve a larger magnification, the spatial configuration must be increased; while the bridge type amplification has a large amplification ratio, but the stiffness is low, and the load bearing capacity is too low to meet some high load bearing needs.

The U.S. disclosure patent with an application number of U.S. Pat. No. 15,853,847 discloses a large load bearing guide mechanism and a multi-degree-of-freedom large-stroke high-precision motion platform system. The present disclosure comprises a rigid frame in which a motion platform is arranged, used for generating a large-stroke displacement to achieve high-speed motion. The present disclosure also comprises: a non-contact actuator, used for driving the motion platform; and a core motion platform connected with a motion portion of the non-contact actuator, connected with the rigid frame by a first flexible hinge group and a second flexible hinge group, and used for generating a small-stroke precision displacement by an elastic deformation of the flexible hinge groups under the driving of the actuator. The motion platform system can be flexibly constructed according to needs, and manufactured by using a general processing method, without using air flotation, magnetic levitation and other special components, the cost is low, and problems of short strokes and high costs of existing high-precision motion platforms are solved. However, the present disclosure still has room for improvement regarding the following technical problems: external vibration interferences easily cause shaking, resulting in motion interferences and reduced positioning accuracy; and instantaneous changes of the sliding direction of the platform easily cause shaking and displacements, resulting in shortening of the life of parts.

SUMMARY OF THE PRESENT INVENTION

An object of the present disclosure is to provide a large-stroke air flotation type nano-positioning platform having high stability and multiple air flotation support modes.

The present disclosure uses the following technical solution to achieve the above object:

A large-stroke air flotation type nano-positioning platform, comprises a base platform, wherein, a linear motor is provided on the base platform and connected with an air flotation platform, a bearing platform is provided below the air flotation platform, a plurality of shock absorption assemblies are embedded in the base platform and arranged at intervals below the bearing platform. The linear motor drives the air flotation platform to slide on the bearing platform, an air flotation bearing is installed below the air flotation platform to achieve air flotation support while sliding, the air flotation platform can stop the motion in time while sliding to achieve accurate positioning, and the linear motor will generate a vibration while operating and transmit the vibration to the base platform, the vibration transmission of the base platform to the bearing platform is weakened by the shock absorption assembly, so that the positioning accuracy of the air flotation platform is ensured.

Preferably, the shock absorption assembly comprises a bottom plate, shock absorption columns are symmetrically provided on an upper end of the bottom plate, a piston is cooperatively arranged in the shock absorption column, a cavity is formed between a bottom end of the piston and an inner wall of the shock absorption column, a sliding rod is fixed on an upper end of the piston, an assembly joint is connected to a top end of the sliding rod and to a bottom end of the bearing platform, a top plate is provided on the assembly joint and connected to the bottom end of the bearing platform, and a shock absorption spring is provided between the assembly joint and the shock absorption column and sleeved on the sliding rod. The vibration generated by the operation of the linear motor and the ground vibration are transmitted to the base platform, when the base platform vibrates, the shock absorption column on the bottom plate is driven to move relative to the piston, the piston squeezes the cavity to consume the vibration and reduce the vibration transmission, at the same time, the plurality of shock absorption columns can weaken vibration forces in different directions, the vibration transmission is further reduced, the stability of the bearing platform and the parallelism of the bearing platform relative to the air flotation platform are effectively ensured, the sliding precision is improved, when the piston squeezes the cavity, the shock absorption column is close to the assembly joint and the shock absorption spring is squeezed, and after the vibration is consumed, the shock absorption spring returns to ensure that the next vibration transmission can be consumed.

Preferably, the assembly joint comprises an assembly frame, the assembly frame is fixed on a top portion of the sliding rod and has an upward tapered curved surface, groove bodies are circularly provided on the tapered curved surface, a roller is rotatably arranged in the groove body, an assembly cover is cooperatively arranged above the assembly frame, a plurality of assembly covers are fixed with the same top plate, the top plate is fixed to the bottom end of the bearing platform, an inner wall of the assembly cover is cooperatively arranged with the tapered curved surface, and the assembly cover can be in contact with the roller. The vibration generated by the operation of the linear motor and the ground vibration are transmitted to the base platform, and the bearing platform drives the assembly cover to move on the assembly frame and be in contact with each roller, so that a rolling friction is generated between the roller and the assembly cover and the shaking is consumed, and the transmission of vibration energy to the bearing platform is consumed, the bearing platform is prevented from transmitting the vibration to the air flotation platform and affecting the sliding of the air flotation platform, which helps to maintain the parallelism between the air flotation platform and the bearing platform, and improve the sliding precision.

Preferably, a plurality of square grooves are provided downward on an upper end surface of the base platform, the square groove and the shock absorption assembly are equal in number and provided in corresponding positions, and the bottom plate is provided at a bottom end of the square groove. The plurality of shock absorption columns and assembly joints form a gap between the bearing platform and the base platform, the circulation effect of an air flow around the bearing platform is improved, which helps the air flow to rapidly flow and dissipate after an air film is output by the air flotation bearing on the bearing platform, the discharged air flow is prevented from rapidly flowing backward and affecting the air flotation bearing after being in contact with the base platform, and the stability of the air flotation is improved.

Preferably, installation holes are provided at intervals on an upper end of the bearing platform, an auxiliary air flotation element is provided in the installation hole, the auxiliary air flotation element comprises a porous plate, a column body and a baffle plate connected in sequence from top to bottom, the porous plate and the baffle plate are cooperatively arranged with the installation hole, respectively, a same air inlet pipeline is communicated below the installation holes, the air inlet pipeline is provided in the bearing platform and communicated to the outside, and connected with a first air pump. The air flow output by the air flotation bearing can be partially trapped in the porous plate, the first air pump can output a gas to the air inlet pipeline, the air inlet pipeline shunts the gas into each installation hole, so that the baffle plate is pushed to drive the column body and the porous plate at a top portion to slide upward in the installation hole, at this moment, the air flotation platform does not need the air flotation bearing to output the air film, and the floating porous plate lifts the air flotation platform to form a sliding support.

Preferably, a baffle ring is provided in the installation hole, the column body is cooperatively arranged with the baffle ring, an auxiliary air passage is communicated between walls of the installation hole located above and below the baffle ring, and an air outlet channel is provided in the column body and communicated with a top portion and a side wall of the column body. The air flow input to the installation hole can enter into a space on a side of the column body through the auxiliary air passage, and enter into the air outlet channel from the side of the column body to a top portion of the column body and be output, the output air flow can be evenly output from the porous plate to form the air film so as to form an air flotation support for the air flotation platform, and when the air flotation bearing fails, the porous plate outputting the air flow upward can still provide a flotation support, the sliding stability of the air flotation platform is ensured, and at the same time, a motion interference generated between the air flotation platform and the linear motor caused by clogging of the air flotation bearing is avoided, and maintenance costs are reduced.

Preferably, a port of the auxiliary air passage located below the baffle ring is located on a side of the baffle plate, and a port of the auxiliary air passage located above the baffle ring is located below the porous plate. The baffle plate is slidably limited by the gas baffle ring put in the installation hole, the porous plate is prevented from moving upward too much to hit the air flotation platform to cause an interference, when the baffle plate at a bottom portion is pushed to move upward by the air flow entering into the installation hole, the baffle plate leaves the lower port of the auxiliary air passage, at this moment, the air flow entering into the installation hole can flow to the upper port through the lower port of the auxiliary air passage, and then act on the porous plate from the air outlet channel, so that the porous plate first moves upward and then outputs the air flow, the effectiveness of the air flotation support is ensured, the air flow is prevented from being dispersed when the porous plate is too far away from the air flotation platform, causing insufficient air flotation support force, the air flotation platform is prone to fall when the air flotation bearing is clogged and in malfunction, after the air flotation platform falls, the air flow output by the porous plate is clogged, at this moment, the air flow output by the first air pump enters into the installation hole and accumulates below the baffle plate, the baffle plate is supported by air pressure, so that the baffle plate is prevented from rapidly falling and hitting a bottom portion of the installation hole to cause abrasion.

Preferably, limitation elements are provided at two end positions of the bearing platform, the limitation element comprises an installation sleeve embedded in the bearing platform, a sliding column is provided in the installation sleeve, a rubber joint is fixed on a top portion of the sliding column, a hole body is provided at a bottom portion of the installation sleeve, the sliding column is cooperatively arranged in the hole body and capable of sliding, a limitation air passage is provided in the bearing platform, and the limitation air passage is communicated with the bottom portion of the installation sleeve and externally connected with a second air pump. When the air flotation platform slides to the end of the stroke, the second air pump outputs the air flow to the bottom portion of the installation sleeve and the air flow acts on the sliding column, so that the sliding column drives the rubber joint on a top portion to move upward and abut against a bottom portion of the air flotation platform, and the air flotation platform is slowly decelerated.

By arranging the shock absorption assembly below the bearing platform to prevent vibration interferences, the present disclosure has the following beneficial effects: the shock absorption assembly consumes the displacement generated by the vibration by squeezing the cavity through the piston, which reduces the vibration interferences and improves the sliding precision of the air flotation platform on the bearing platform; the vibration causes a relative displacement between the assembly cover and the assembly element, the rolling contact between the assembly cover and the roller reduces the vibration transmission in the vertical direction, which ensures the parallelism between the bearing platform and the air flotation platform and improves sliding smoothness and precision; the auxiliary air flotation element uses the porous plate capable of floating and outputting the air flow to achieve air flotation support for the air flotation platform when the air flotation bearing fails, which avoids damages caused by the air flotation platform falling; the air flotation platform can achieve air flotation motion without being equipped with the air flotation bearing, which reduces production costs; when the first air pump is started, the auxiliary air passage moves the porous plate upward and then outputs the air film, which ensures that the porous plate outputs the air flow within an effective distance below the air flotation platform and ensures the stability of the air flotation support; when the air flotation platform falls accidentally, a support can be formed through the accumulation of air pressure below the baffle plate, which slows down the falling speed and prevents damage to parts caused by falling and hitting; and the limitation element decelerates through contact and friction with the bottom portion of the air flotation platform, which reduces the possibility of interferences generated by the shaking of the air flotation platform after an emergency stop with the bearing platform. Therefore, the present disclosure is a large-stroke air flotation type nano-positioning platform having high stability and multiple air flotation support modes.

Figure 1:
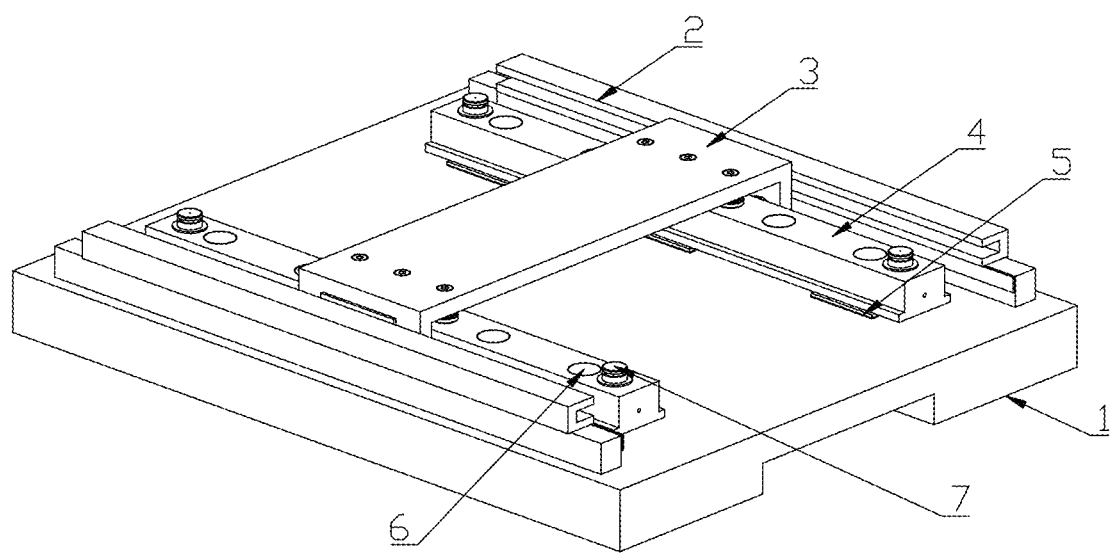
FIG. 1 is a schematic diagram of a connection among a base platform, an air flotation platform and a bearing platform.

Numerals of the drawings are described as follows: base platform 1; square groove 10; linear motor 2; air flotation platform 3; bearing platform 4; installation hole 40; air inlet pipeline 41; shock absorption assembly 5; bottom plate 50; shock absorption column 51; piston 52; sliding rod 53; assembly joint 54; top plate 55; shock absorption spring 56; assembly frame 540; groove body 541; roller 542; assembly cover 543; auxiliary air flotation element 6; porous plate 60; column body 61; baffle plate 62; baffle ring 63; auxiliary air passage 64; limitation element 7; installation sleeve 70; sliding column 71; rubber joint 72; sealing plate 73; return spring 74; main air hole 710; auxiliary air hole 711; and air jet hole 720.

DESCRIPTION OF EMBODIMENTS

The technical solution of the present disclosure will be further elaborated below in detail in conjunction with embodiments and drawings. Obviously, the elaborated embodiments are only some of the embodiments of the present disclosure, but not all of the embodiments. Based on the embodiments of the present disclosure, all other embodiments, obtained by those of ordinary skill in the art without creative efforts, fall within the scope of protection of the present disclosure.

Figure 2:
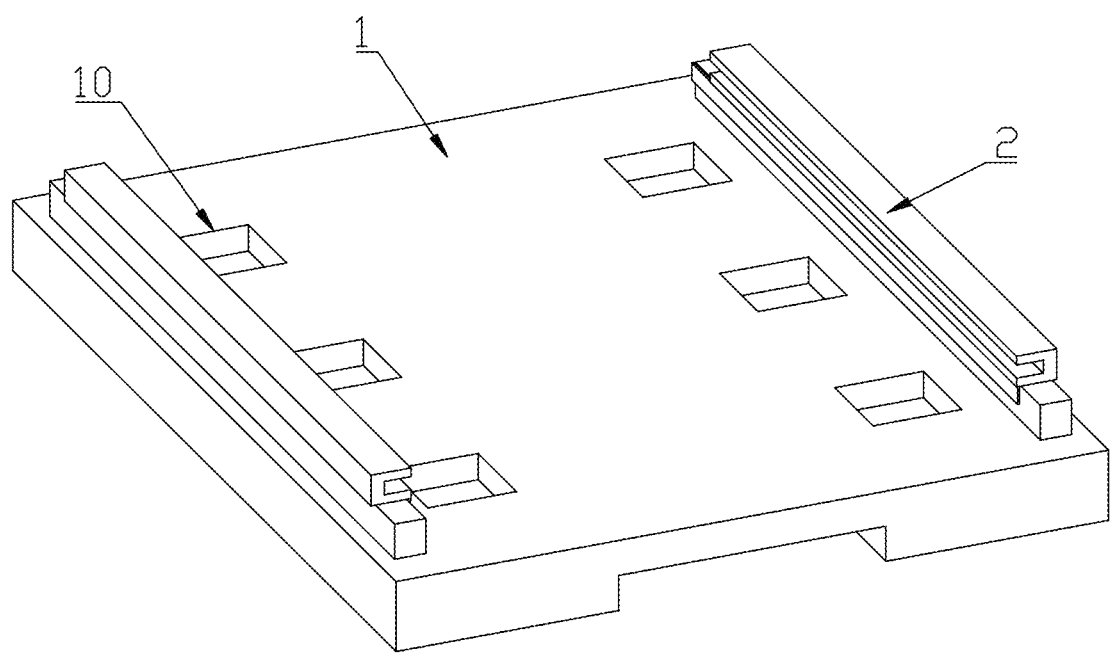
FIG. 2 is a schematic diagram of a location of a square groove.
Figure 3:
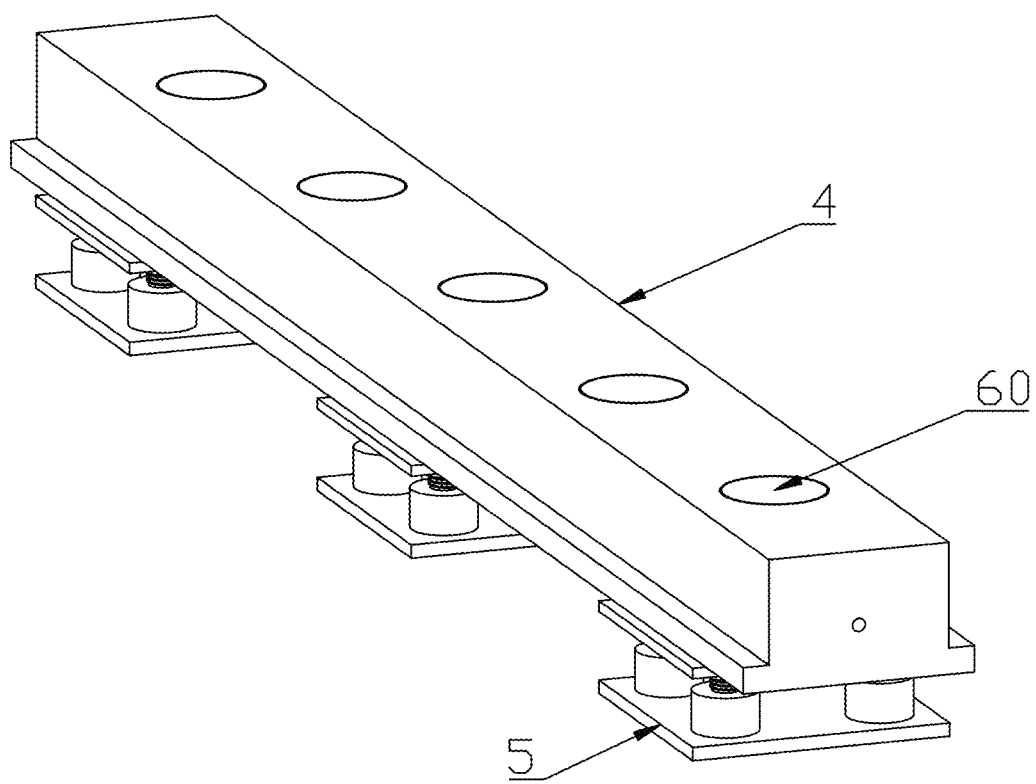
FIG. 3 is a schematic diagram of a connection between the bearing platform and a shock absorption assembly.

With reference to FIG. 1 to FIG. 3, a large-stroke air flotation type nano-positioning platform comprises a base platform 1, wherein, a linear motor 2 is provided on the base platform 1 and connected with an air flotation platform 3, a bearing platform 4 is provided below the air flotation platform 3, a plurality of shock absorption assemblies 5 are embedded in the base platform 1 and arranged at intervals below the bearing platform 4, and an air flotation bearing can be installed below the air flotation platform 3.

The linear motor 2 drives the air flotation platform 3 to slide on the bearing platform 4, an air flotation support while sliding is achieved by installing the air flotation bearing below the air flotation platform 3, the air flotation platform 3 can stop the motion in time while sliding to achieve accurate positioning, the linear motor 2 will generate a vibration while operating and transmit the vibration to the base platform 1, and the vibration transmission of the base platform 1 to the bearing platform 4 is weakened by the shock absorption assembly 5, so that the positioning accuracy of the air flotation platform 3 is ensured.

Figure 4:
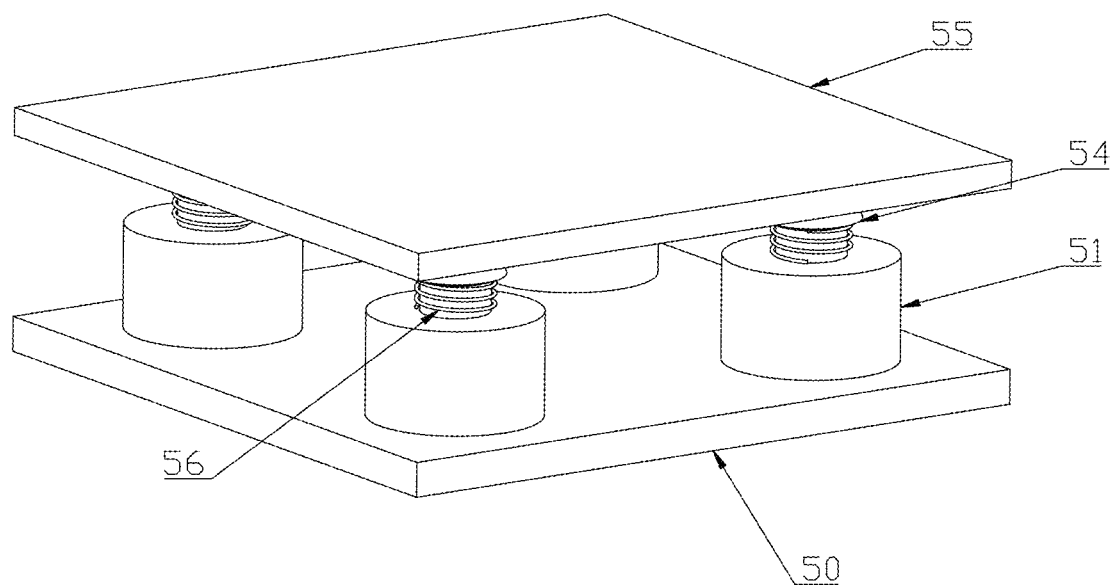
FIG. 4 is a schematic diagram of a structure of the shock absorption assembly.
Figure 5:
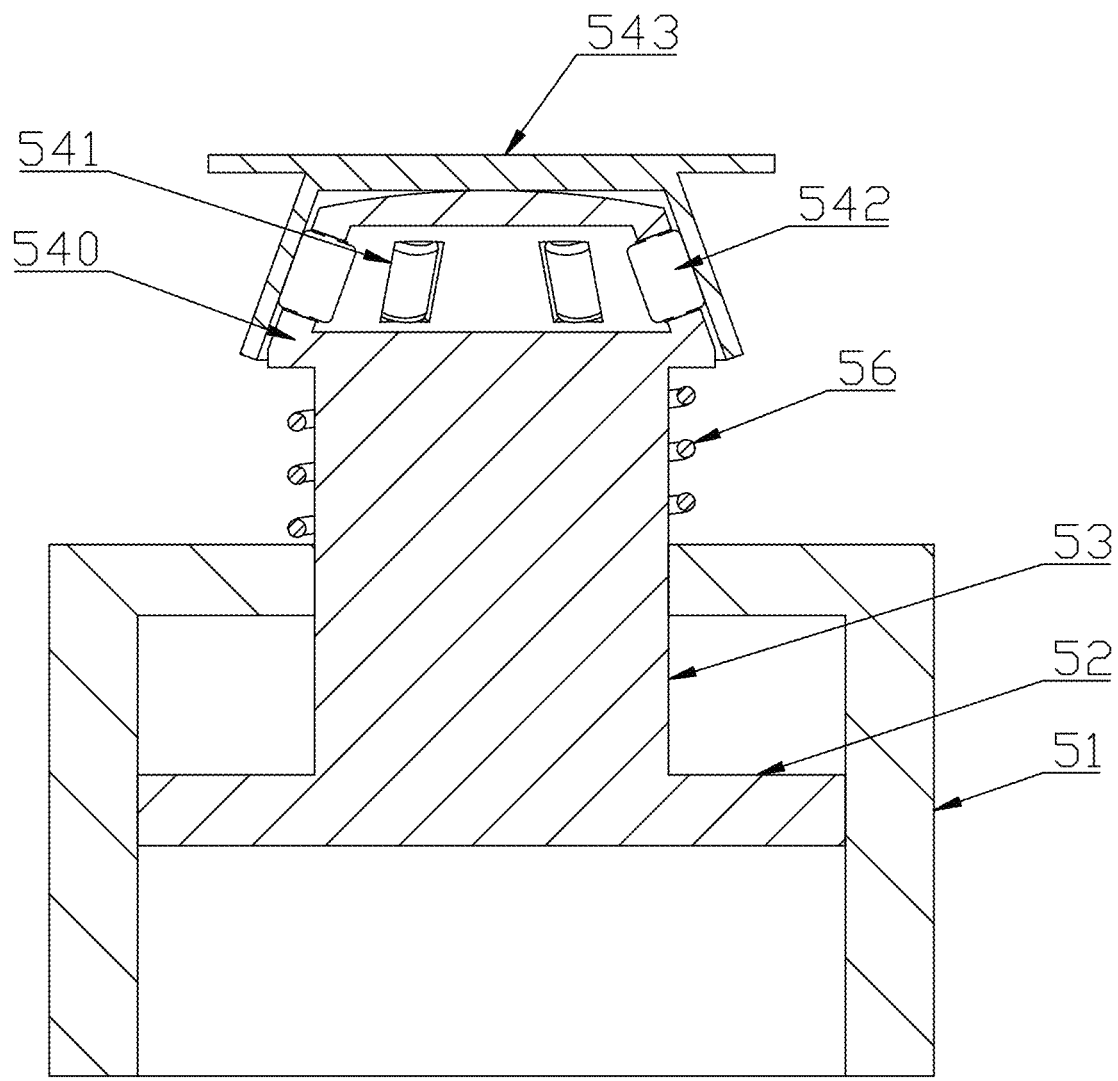
FIG. 5 is a schematic diagram of a partial cross-section of a shock absorption column.

With reference to FIG. 4 to FIG. 5, the shock absorption assembly 5 comprises a bottom plate 50, shock absorption columns 51 are symmetrically provided on an upper end of the bottom plate 50, a piston 52 is cooperatively arranged in the shock absorption column 51, a cavity is formed between a bottom end of the piston 52 and an inner wall of the shock absorption column 51, a sliding rod 53 is fixed on an upper end of the piston 52, an assembly joint 54 is connected to a top end of the sliding rod 53, a plurality of assembly joints 54 are connected with a same top plate 55, the top plate 55 is fixed on a bottom end of the bearing platform 4, and a shock absorption spring 56 is provided between the assembly joint 54 and the shock absorption column 51 and sleeved on the sliding rod 53.

The vibration generated by the operation of the linear motor 2 and the ground vibration are transmitted to the base platform 1, when the base platform 1 vibrates, the shock absorption column 51 on the bottom plate 50 is driven to move relative to the piston 52, the piston 52 squeezes the cavity to consume the vibration and reduce the vibration transmission, at the same time, the plurality of shock absorption columns 51 can weaken vibration forces in different directions, the vibration transmission is further reduced, the stability of the bearing platform 4 and the parallelism of the bearing platform 4 relative to the air flotation platform 3 are effectively ensured, the sliding precision is improved, when the piston 52 squeezes the cavity, the shock absorption column 51 is close to the assembly joint 54 and the shock absorption spring 56 is squeezed, and after the vibration is consumed, the shock absorption spring 56 returns to ensure that the next vibration transmission can be consumed.

The assembly joint 54 comprises an assembly frame 540, the assembly frame 540 is fixed on a top portion of the sliding rod 53 and has a tapered curved surface with a small end upward, groove bodies 541 are circularly provided on the tapered curved surface, a roller 542 is rotatably arranged in the groove body 541, an assembly cover 543 is cooperatively arranged above the assembly frame 540, a top portion of the assembly cover 543 is fixed with the bottom end of the bearing platform 4, an inner wall of the assembly cover 543 is cooperatively arranged with the tapered curved surface, and the assembly cover 543 can be in contact with the roller 542.

The vibration generated by the operation of the linear motor 2 and the ground vibration are transmitted to the base platform 1, and the bearing platform 4 drives the assembly cover 543 to move on the assembly frame 540 and be in contact with each roller 542, so that a rolling friction is generated between the roller 542 and the assembly cover 543 and the shaking is consumed, and the transmission of vibration energy to the bearing platform 4 is consumed, the bearing platform 4 is prevented from transmitting the vibration to the air flotation platform 3 and affecting the sliding of the air flotation platform 3, which helps to maintain the parallelism between the air flotation platform 3 and the bearing platform 4, and improve the sliding precision.

With reference to FIG. 2, a plurality of square grooves 10 are provided downward on an upper end surface of the base platform 1, the square groove 10 and the shock absorption assembly 5 are equal in number and provided in corresponding positions, the bottom plate 50 is provided at a bottom end of the square groove 10, and an upper end surface of the assembly joint 54 is located above the upper end surface of the base platform 1. The plurality of shock absorption columns 51 and assembly joints 54 form a gap between the bearing platform 4 and the base platform 1, the circulation effect of an air flow around the bearing platform 4 is improved, which helps the air flow to rapidly flow and dissipate after an air film is output by the air flotation bearing on the bearing platform 4, the discharged air flow is prevented from rapidly flowing backward and affecting the air flotation bearing after being in contact with the base platform 1, and the stability of the air flotation is improved.

Figure 6:
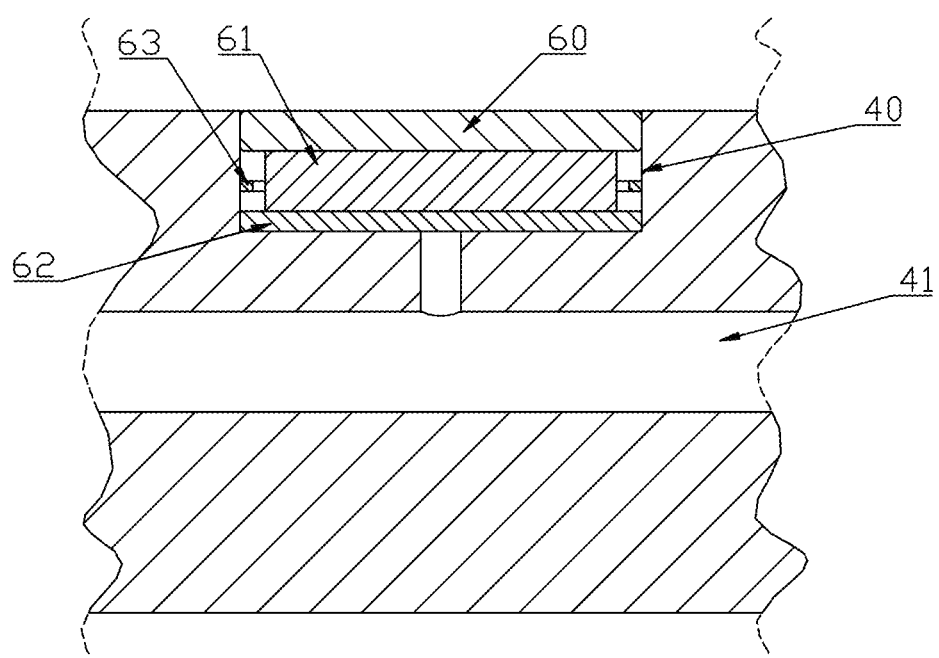
FIG. 6 is a schematic diagram of a connection between an installation hole and an air inlet pipeline.
Figure 7:
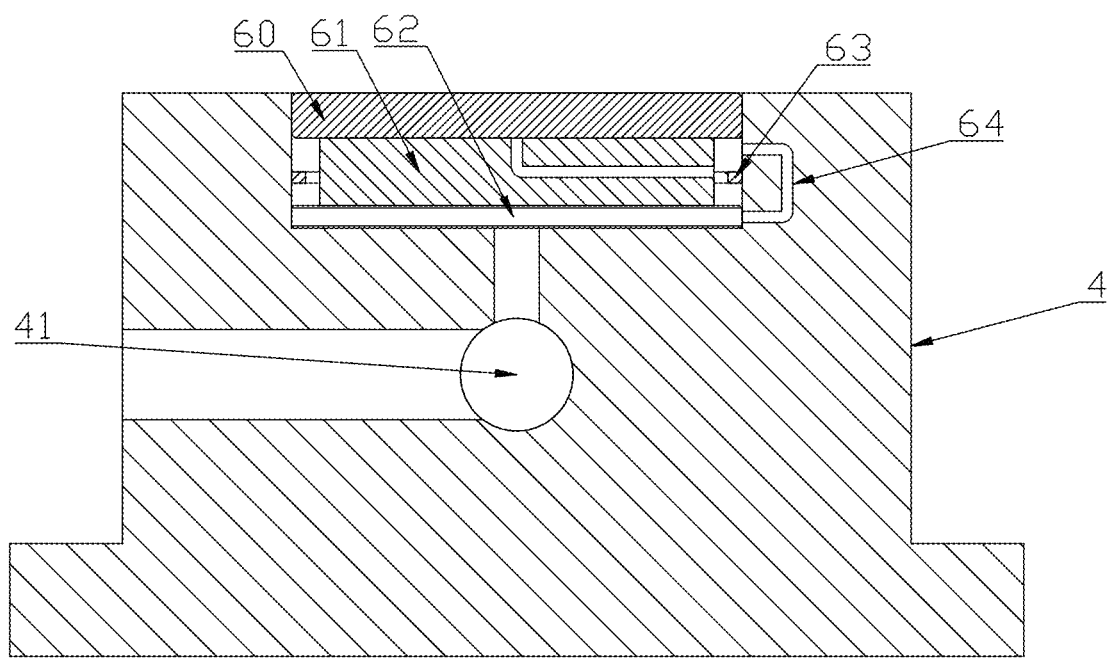
FIG. 7 is a schematic diagram of a cross-section of an auxiliary air flotation element.

With reference to FIG. 6 to FIG. 7, installation holes 40 are provided at intervals on an upper end of the bearing platform 4, an auxiliary air flotation element 6 is provided in the installation hole 40, the auxiliary air flotation element 6 comprises a porous plate 60, a column body 61 and a baffle plate 62 connected in sequence from top to bottom, the porous plate 60 and the baffle plate 62 are cooperatively arranged with the installation hole 40, respectively, a same air inlet pipeline 41 is communicated below the installation holes 40, the air inlet pipeline 41 is provided in the bearing platform 4 and communicated to the outside, and connected with a first air pump.

The air flow output by the air flotation bearing can be partially trapped in the porous plate 60, the first air pump can output a gas to the air inlet pipeline 41, the air inlet pipeline 41 shunts the gas into each installation hole 40, so that the baffle plate 62 is pushed to drive the column body 61 and the porous plate at a top portion to slide upward in the installation hole 40, at this moment, the air flotation platform 3 does not need the air flotation bearing to output the air film, and the floating porous plate 60 lifts the air flotation platform 3 to form a sliding support.

A baffle ring 63 is provided in the installation hole 40, the column body 61 is cooperatively arranged with the baffle ring 63, an auxiliary air passage 64 is communicated between walls of the installation hole 40 located above and below the baffle ring 63, an air outlet channel 65 is provided in the column body 61 and communicated with a top portion and a side wall of the column body 61, and both the air outlet channel 65 and the auxiliary air passage 64 are communicated to a space outside the column body 61.

The air flow input to the installation hole 40 can enter into a space on a side of the column body 61 through the auxiliary air passage 64, and enter into the air outlet channel 65 from the side of the column body 61 to a top portion of the column body 61 and be output, the output air flow can be evenly output from the porous plate to form the air film so as to form an air flotation support for the air flotation platform 3, and when the air flotation bearing fails, the porous plate 60 outputting the air flow upward can still provide a flotation support, the sliding stability of the air flotation platform 3 is ensured, and at the same time, a motion interference generated between the air flotation platform 3 and the linear motor 2 caused by clogging of the air flotation bearing is avoided, and maintenance costs are reduced.

A port of the auxiliary air passage 64 located below the baffle ring 63 is located on a side of the baffle plate 62, a port of the auxiliary air passage 64 located above the baffle ring 63 is located below the porous plate 60, and the porous plate 60 can be pushed out and be in contact with the air flotation bearing.

The baffle plate 62 is slidably limited by the gas baffle ring 63 put in the installation hole 40, the porous plate 60 is prevented from moving upward too much to hit the air flotation platform 3 to cause an interference, when the baffle plate 62 at a bottom portion is pushed upward by the air flow entering into the installation hole 40, the baffle plate 62 leaves the lower port of the auxiliary air passage 64, at this moment, the air flow entering into the installation hole 40 can flow to the upper port through the lower port of the auxiliary air passage 64, and then act on the porous plate 60 from the air outlet channel 65, so that the porous plate 60 first moves upward and then outputs the air flow, the effectiveness of the air flotation support is ensured, the air flow is prevented from being dispersed when the porous plate 60 is too far away from the air flotation platform 3, causing insufficient air flotation support force, the air flotation platform 3 is prone to fall when the air flotation bearing is clogged and in malfunction, after the air flotation platform 3 falls, the air flow output by the porous plate 60 is clogged, at this moment, the air flow output by the first air pump enters into the installation hole 40 and accumulates below the baffle plate 62, the baffle plate 62 is supported by air pressure, so that the baffle plate 62 is prevented from rapidly falling and hitting a bottom portion of the installation hole 40 to cause abrasion.

Figure 8:
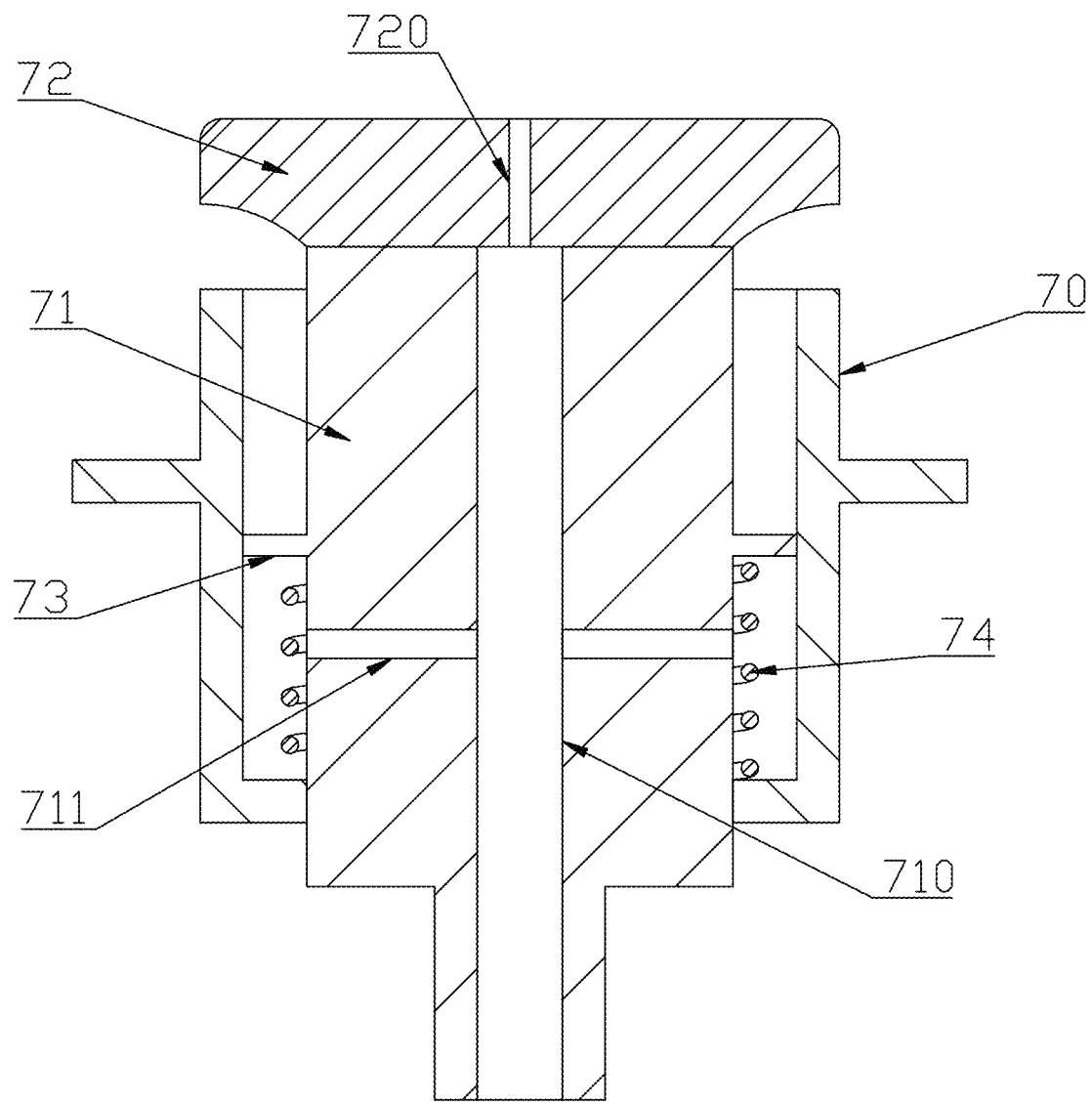
FIG. 8 is a schematic diagram of a cross-section of a limitation element.

With reference to FIG. 8, limitation elements 7 are provided at two end positions of the bearing platform 4, the limitation element 7 comprises an installation sleeve 70 embedded in the bearing platform 4, a sliding column 71 is provided in the installation sleeve 70, a rubber joint 72 is fixed on a top portion of the sliding column 71, a hole body is provided at a bottom portion of the installation sleeve 70, the sliding column 71 is cooperatively arranged in the hole body and capable of sliding, a limitation air passage 42 is provided in the bearing platform 4, and the limitation air passage 42 is communicated with the bottom portion of the installation sleeve 70 and externally connected with a second air pump.

It shall be noted that the linear motor 2 has a grating scale for detecting a sliding location of the air flotation platform 3.

When the air flotation platform 3 slides to the end of the stroke, the second air pump outputs the air flow to the bottom portion of the installation sleeve 70 and the air flow acts on the sliding column 71, so that the sliding column 71 drives the rubber joint 72 on a top portion to move upward and abut against a bottom portion of the air flotation platform 3, and the air flotation platform 3 is slowly decelerated.

A sealing plate 73 is connected at a middle portion of the sliding column 71, and cooperatively arranged with an inner wall of the installation sleeve 70 and capable of axially sliding, a return spring 74 is arranged between the sealing plate 73 and the bottom portion of the installation sleeve 70 and sleeved on the sliding column 71, a main air hole 710 is provided at an axis of the sliding column 71 and communicates upper and lower end surfaces of the sliding column 71, the sliding column 71 is provided with an auxiliary air hole 711, the auxiliary air hole 711 is located below the sealing plate 73 and communicated with the main air hole 710, an air jet hole 720 is provided at an axis of the rubber joint 72, the diameter of the air jet hole 720 is much smaller than that of the main air hole 710, and the air jet hole 720 is communicated with the main air hole 710.

When the second pump is started, and when the grating ruler detects that the air flotation platform 3 is close to the end of the stroke, a part of the air flow entering into the limitation air passage 42 can be output from the air jet hole 720 to form an air flow opposing the air film output by the air flotation bearing, so that the air flotation platform 3 is decelerated; and when the grating ruler detects that the air flotation platform 3 reaches the end of the stroke, the other part of the air flow entering into the limitation air passage 42 is output from the main air hole 710 to the auxiliary air hole 711, at this moment, the air pressure in a cavity body among the sliding column 71, the installation sleeve 70 and the sealing plate 73 increases, the sealing plate 73 is pushed to drive the sliding column 71 to slide upward, so that the rubber joint 72 is close to and abutted against the air flotation platform 3, the deceleration speed of the rubber joint 72 on the air flotation platform 3 is increased through pneumatics, and the positioning accuracy is improved, and compared with a plate body limitation solution of the prior art, the friction contact method avoids damages to parts and vibration interferences caused by hitting during emergency stop of the air flotation platform 3, causing inaccurate positioning.

As for those skilled in the art, it is obvious that the present disclosure is not limited to the details of the above exemplary embodiments, and the present disclosure can be implemented in other specific forms without departing from the spirit or essential characteristics of the present disclosure. Therefore, the embodiments shall be regarded as demonstrative and not restrictive in any aspect, and the scope of the present disclosure is defined by the claims rather than the above description, so all changes that fall within the meaning and scope of equivalent essential elements of the claims are intended to be included in the present disclosure. Any markings of the drawings in the claims shall not be regarded as limiting the claims involved.

What is claimed is:

1. A large-stroke air flotation type nano-positioning platform, comprising a base platform (1), wherein, a liner motor (2) is provided on the base platform (1) and connected with an air flotation platform (3), and a bearing platform (4) is provided below the air flotation platform (3);

a plurality of shock absorption assemblies (5) are embedded in the base platform (1) and arranged at intervals below the bearing platform (4);

each of the plurality of shock absorption assemblies (5) comprises a bottom plate (50), shock absorption columns (51) are symmetrically provided on an upper end of the bottom plate (50), a piston (52) is cooperatively arranged in the shock absorption column (51), a cavity is formed between a bottom end of the piston (52) and an inner wall of the shock absorption column (51), a sliding rod (53) is fixed on an upper end of the piston (52), an assembly joint (54) is connected to a top end of the sliding rod (53), a top plate (55) is provided on the assembly joint (54) and connected to a bottom end of the bearing platform (4), and a shock absorption spring (56) is provided between the assembly joint (54) and the shock absorption column (51), and the shock absorption spring (56) is sleeved on the sliding rod (53);

the assembly joint (54) comprises an assembly frame (540), the assembly frame (540) is fixed on the top end of the sliding rod (53) and has an upward tapered curved surface, groove bodies (541) are circularly provided on the tapered curved surface, a roller (542) is rotatably arranged in the groove body (541), an assembly cover (543) is cooperatively arranged above the assembly frame (540), a top portion of the assembly cover (543) is fixed to the bottom end of the bearing platform (4), an inner wall of the assembly cover (543) is matched with the tapered curved surface, and the assembly cover (543) is capable of contacting with the roller (542);

installation holes (40) are provided at intervals on an upper end of the bearing platform (4), an auxiliary air flotation element (6) is provided in each of the installation holes (40), the auxiliary air flotation element (6) comprises a porous plate (60), a column body (61) and a baffle plate (62) connected in sequence from top to bottom, the porous plate (60) and the baffle plate (62) are cooperatively arranged with the installation hole (40), respectively, the installation holes (40) are communicated with an air inlet pipeline (41) arranged below the installation holes, the air inlet pipeline (41) is provided in the bearing platform (4) and communicated to the outside, the air inlet pipeline (41) is connected with a first air pump, a baffle ring (63) is provided in each of the installation holes (40), the column body (61) is coupled with the baffle ring (63), an auxiliary air passage (64) is communicated between walls of the installation hole (40) located above and below the baffle ring (63), and an air outlet channel is provided in the column body (61) and communicated with a top portion and a side wall of the column body (61); and a port of the auxiliary air passage (64) located below the baffle ring (63) is located on a side of the baffle plate (62), and a port of the auxiliary air passage (64) located above the baffle ring (63) is located below the porous plate (60).

2. The large-stroke air flotation type nano-positioning platform according to claim 1, wherein a plurality of square grooves (10) are provided downward on an upper end surface of the base platform (1), a number of the plurality of square grooves (10) is identical to a number of the plurality of shock absorption assemblies (5) and the plurality of square grooves (10) are arranged corresponding to the plurality of shock absorption assemblies (5), and the bottom plate (50) is provided at a bottom end of the plurality of square grooves (10).

3. The large-stroke air flotation type nano-positioning platform according to claim 1, wherein limitation elements (7) are provided at two end positions of the bearing platform (4), each of the limitation elements (7) comprises an installation sleeve (70) embedded in the bearing platform (4), a sliding column (71) is provided in the installation sleeve (70), a rubber joint (72) is fixed on a top portion of the sliding column (71), a hole body is provided at a bottom portion of the installation sleeve (70), the sliding column (71) is cooperatively arranged in the hole body and capable of sliding, a limitation air passage is provided in the bearing platform (4), and the limitation air passage is communicated with the bottom portion of the installation sleeve (70) and externally connected with a second air pump.

\* \* \* \* \*